(12) United States Patent
Champion et al.

(10) Patent No.: US 8,611,032 B2
(45) Date of Patent: Dec. 17, 2013

(54) DIRECTIONAL WRITE RETRY FOR SHINGLED DISK DRIVE APPLICATION

(75) Inventors: Eric J. Champion, San Jose, CA (US); James N. Malina, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 454 days.

(21) Appl. No.: 12/977,658

(22) Filed: Dec. 23, 2010

(65) Prior Publication Data

US 2012/0162806 A1    Jun. 28, 2012

(51) Int. Cl.
 *G11B 27/36* (2006.01)
 *G11B 5/596* (2006.01)
 *G11B 5/09* (2006.01)

(52) U.S. Cl.
 USPC .............................. 360/31; 360/77.08; 360/54

(58) Field of Classification Search
 None
 See application file for complete search history.

(56) References Cited

U.S. PATENT DOCUMENTS

| | | | |
|---|---|---|---|
| 6,845,405 B1 | 1/2005 | Thelin | |
| 6,967,810 B2 | 11/2005 | Kasiraj et al. | |
| 6,995,943 B1 | 2/2006 | Shrestha et al. | |
| 7,082,007 B2 | 7/2006 | Liu et al. | |
| 7,394,607 B2 | 7/2008 | Ohno et al. | |
| 7,408,731 B2 | 8/2008 | Uemura et al. | |
| 7,417,813 B2 | 8/2008 | Lim et al. | |
| 7,525,745 B2 | 4/2009 | Nitta | |
| 7,916,421 B1 * | 3/2011 | Liikanen et al. | 360/77.01 |
| 2005/0069298 A1 | 3/2005 | Kasiraj et al. | |
| 2005/0071537 A1 | 3/2005 | New et al. | |
| 2006/0215307 A1 | 9/2006 | Yoshida et al. | |
| 2007/0030588 A1 | 2/2007 | Tsuchinaga et al. | |
| 2010/0328798 A1 | 12/2010 | Vaidyanathan et al. | |

\* cited by examiner

*Primary Examiner* — Andrew L Sniezek

(57) ABSTRACT

Embodiments described herein include systems and methods for correcting for errors caused by disturbances to disk drives, such as disturbances due to shocks or vibrations incident on the drive. For example, systems and methods described herein advantageously correct for corruption to current data as well as previously written. Data may be rewritten in the current track that was being written to when the disturbance occurred, and may also be rewritten to one or more nearby previously written tracks, such as one or more adjacent tracks. According to some aspects, the direction of head deviation is used to select the appropriate corrective action.

18 Claims, 4 Drawing Sheets

DIRECTIONAL WRITE RETRY FOR SHINGLED DISK DRIVE APPLICATION

BACKGROUND

1. Technical Field

This disclosure relates to disk drives. More particularly, this disclosure relates to edge detection techniques usable in some embodiments to error correction for disk drives.

2. Description of the Related Art

Disk drives often undergo disturbances during use due to shock conditions, vibrations, and the like. If such disturbances occur during drive operation, errors can occur. For example, the recording head may deviate from its planned trajectory, causing the improper writing of data that was being written when the disturbance occurred. Moreover, in certain cases previously written data can also be corrupted, such as data in one or more adjacent tracks on the disk. As such, there is a need for a robust error correction scheme capable of efficiently detecting disturbances and addressing resulting data corruption.

DETAILED DESCRIPTION OF SPECIFIC EMBODIMENTS

Embodiments described herein include systems and methods for correcting for errors caused by disturbances to disk drives, such as disturbances due to shocks or vibrations incident on the drive.

For example, systems and methods described herein advantageously correct for corruption to current data as well as previously written data. Data may be rewritten in the current track that was being written to when the disturbance occurred, and may also be rewritten to one or more nearby previously written tracks, such as one or more adjacent tracks.

Moreover, in some cases, data is written to the disk sequentially in a predetermined direction, such as in a plurality of overlapping tracks (or "shingles") extending across the disk in a particular radial direction (e.g., inner diameter to outer diameter, or vice versa), as is described in greater detail below. In such configurations, certain systems and methods described herein detect the direction of the disturbance and employ the directional information to efficiently correct for errors. The directional information can be used to determine whether previously written data may have been corrupted, such as where the recording head moves in the direction of previously written data. If so, the previously written data may be re-written. If not, only data in the current track is rewritten. Using this directional sensitivity, a verity of algorithms for rewriting the data can be utilized to improve drive capacity and/or performance.

Error correction schemes are described in greater detail below with respect to the figures. While described primarily with respect to mechanical disturbances such as mechanical shocks or vibrations, the techniques described herein can account for any type of detectable disturbance, such as those due to electrostatic conditions or the like. Generally, this description is intended to illustrate specific embodiments of the inventions, and is not intended to be limiting. Thus, nothing in this description is intended to imply that any particular component, step or characteristic is essential. The inventions are defined only by the claims.

System Overview

Figure 1:
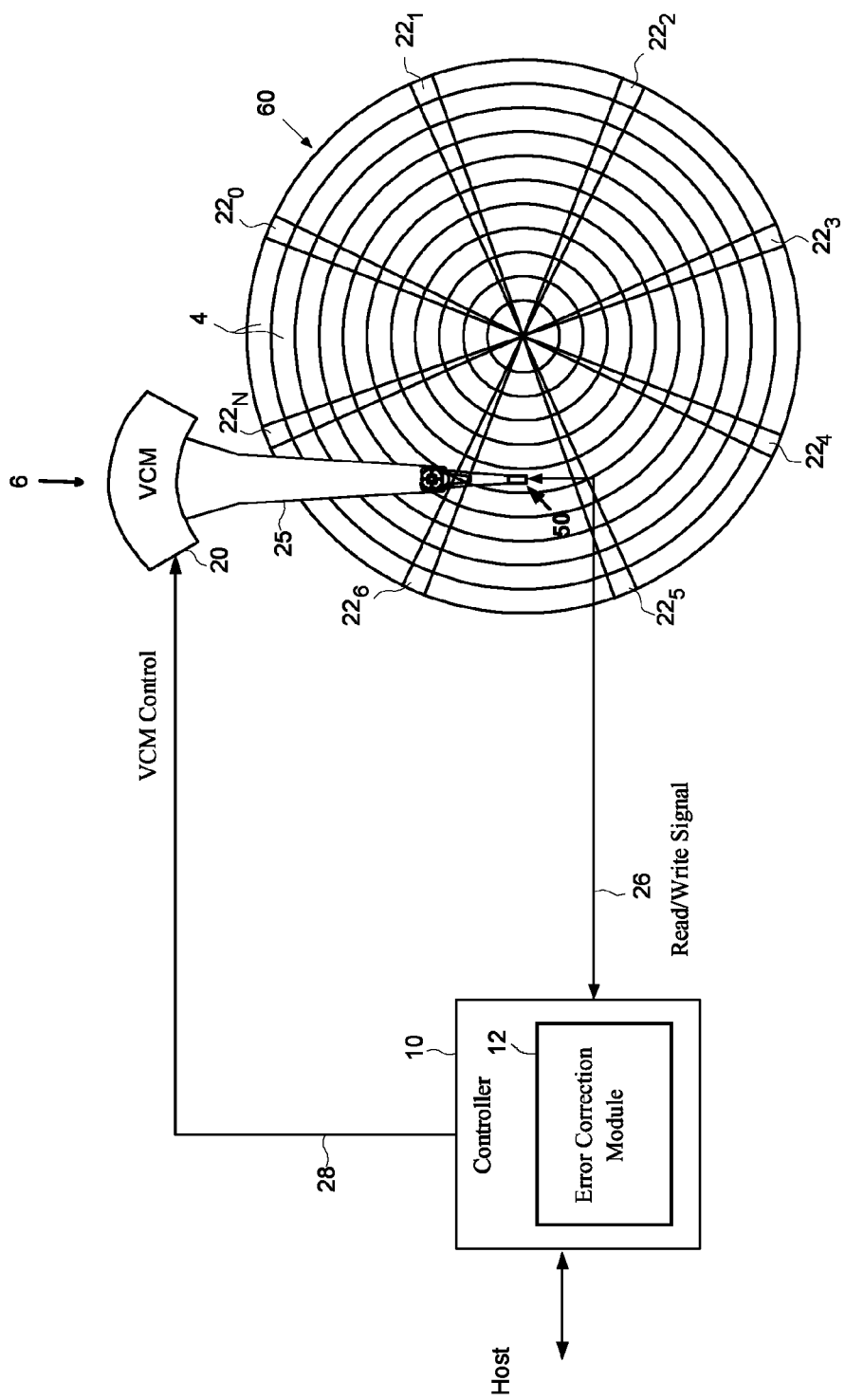
FIG. 1 shows an example disk drive that implements error correction according to embodiments described herein.

FIG. 1 shows an example disk drive implementing error correction according to embodiments described herein. The disk drive includes a controller 10 having an error correction module 12, and a head disk assembly (HDA) 6.

The error correction module 12 may be implemented in firmware code executed by the controller 10; in application-specific circuitry of the controller 10; analog circuitry; or a combination thereof.

The HDA 6 includes a disk 60, an actuator arm 25, a head 50 connected to a distal end of the actuator arm 25, and a voice coil motor (VCM) 20 for rotating the actuator arm 25 about a pivot to position the head 50 radially over the disk 60. While only one disk 60 is shown in FIG. 1, the drive 60 may include additional disks. For example, a platter of disks 60 can be arranged in a vertical stack. The controller 10 is in communication with both the VCM 20 and the recording head 50 of the HDA 6 to write data to and read data from the disk 60 during drive operation.

The controller 10 is also in communication with a host (not shown), such as a host computer in which the drive is installed or otherwise connected. Compatible hosts can include laptops or other portable computing devices, desktops, servers, or generally any computing device. Moreover, the disk drive can be internally housed in the host, or can be coupled to the host via an external connection, depending on the context.

In some embodiments, the drive may further include a separate sensor (not shown) for detecting the direction of head 50 deviation. For example, the sensor can include an accelerometer, microelectromechanical (MEMS) device, or other sensor configured to detect the direction and/or other characteristic of the recording head 50 deviation, or that is otherwise capable detecting disturbances incident on the drive 2. In other embodiments, preexisting componentry is used to detect the direction of head deviation. For example, the controller 10 can derive a position error signal (PES) that can be used instead of or in conjunction with the separate sensor to detect the deviation direction in some embodiments.

The disk 60 can include a plurality of tracks including data sectors 4 and embedded servo sectors $22_0$-$22_N$. A servo writer may be used to write the sectors $22_0$-$22_N$ during manufacturing, or the disk drive may perform self servo-writing in which the drive itself writes the servo sectors to the disk. The servo sectors $22_0$-$22_N$ in one example include preamble, track identifier, and servo burst pattern. The controller 10 can use the burst patterns to determine whether the head 50 is properly aligned with the desired track 4, or whether the head 50 may have instead veered off course.

According to an example implementation, the head 50 is positioned over a selected data track of the plurality of data tracks 4 for following the track during a data write operation. The controller 10 reads the track's embedded servo sectors $22_0$-$22_N$ to generate position PES values. The controller 10 may compare an estimated position that is derived from the read-write signal 26 to a reference position, thereby generating the PES.

In certain configurations, a write unsafe (WUS) limit is provided for terminating a data write operation, such as where at least one PES value exceeds the WUS limit. For example, the WUS limit may correspond to the maximum off-track distance of the write head before the controller terminates the current write operation. Accordingly, when the WUS limit is exceeded the drive terminates the current write operation and performs an error correction (e.g., write retry) operation. Although other more sophisticated error correction schemes are provided herein, as one example the drive waits a complete disk rotation before continuing writing to the targeted data storage locations in the current track. The WUS limit can be specified as a percentage of servo track pitch, defined as the center-to-center distance between adjacent servo tracks. In other words, the WUS limit can be the amount of allowable head deviation as a percentage of track pitch before a write retry is triggered. While one particular write unsafe policy has been described, a wide variety of other policies are compatible with embodiments described herein.

Regardless of the selected error correction scheme, performing error correction in response to WUS limit violations consumes operational cycles, thereby impacting the data transfer rate. As such, particularly where the disk drive is in an environment subject to external vibration or other disturbance, the impact to the data transfer rate can become significant. Thus, increasing the WUS limit can improve the data transfer rate, particularly in an environment in which the drive is subject to disturbances. As will be described, in addition to providing other advantages, certain techniques provided exploit sensitivity to the direction of head deviation to allow for an increased WUS limit while still minimizing the possibility of data loss due to shock events.

Shingled Data Writing

The tracks 4 can comprise a plurality of evenly spaced concentric tracks 4 in certain embodiments. For example, the tracks can be spaced by a predetermined margin so as to mitigate adjacent track interference (ATI). ATI is discussed in greater detail below. Moreover, in certain embodiments, data may be written to pre-determined physical locations on the disk 60, regardless of the temporal sequence in which the data is written. For example, each block of data can be assigned to a particular logical block address (LBA) which is then mapped to a corresponding physical block address (PBA) defining a physical position on the disk 60. Thus, data blocks which are written sequentially in time with respect to one another are not necessarily written to physically contiguous locations on the disk 60.

Figure 2A:
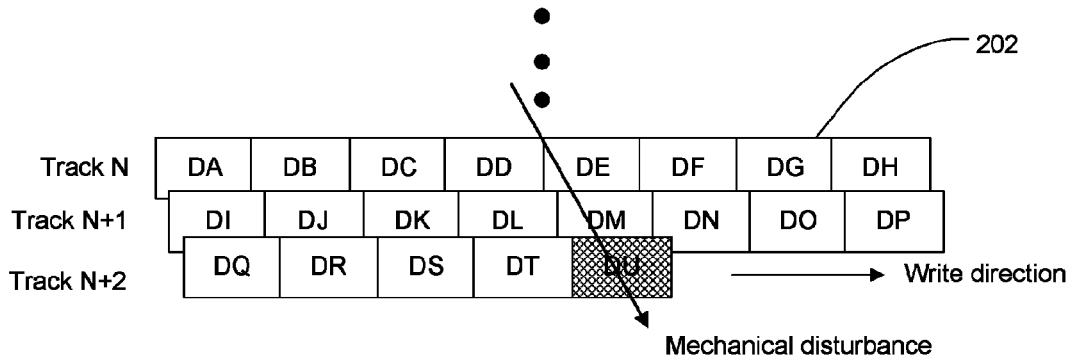
FIG. 2A schematically illustrates a portion of a shingled disk drive where a disturbance in the direction of writing causes corruption of data in a current track according to an embodiment.

In other embodiments, data is written sequentially to physically contiguous locations on the disk 60. For example, data can be written as a series of overlapping tracks, or shingles extending radially across the disk 60. For example, the tracks may be written radially from an inner diameter (ID) of the disk 60 to the outer diameter (OD) of the disk, or vice versa, depending on the selected write policy. FIG. 2A schematically illustrates a portion of a disk drive having a shingled architecture. As shown, $Track_{N+2}$ overlaps $Track_{N+1}$, which in turn overlaps $Track_N$. Data is written sequentially, with the current data sector DU being written to the end of the current shingle ($Track_{N+2}$).

As will be appreciated, FIG. 2A is a simplified representation. The disk 60 generally includes more than three tracks, includes servo sectors, etc. Moreover, only a portion of each of the illustrated tracks ($Track_N$, $Track_{N+1}$, $Track_{N+2}$) are shown. Also, while the data segments are described as sectors for the purposes of illustration, it will be appreciated that the individual data segments shown in FIGS. 2-3 may comprise some other granularity (e.g., data words or groups thereof).

A shingled architecture can be achieved by exploiting the use of a read element of the recording head 50 having a width that is significantly narrower than the write element of the recording head 50, thereby enabling the head 50 to accurately read previously written data despite the fact that a portion of the track is erased by the overlapping subsequently written track. Because the shingled architecture includes overlapping, un-spaced tracks, the amount of utilized surface area of the disk 60 is increased, resulting in a corresponding increase in track density (e.g., the number of tracks per inch) and in the storage capacity of the drive 2.

In addition to the above-described examples, a wide variety of data writing policies are compatible with the error correction techniques described herein. For instance, the tracks 4 may be written sequentially as shown in FIG. 2A, but without overlap. Additionally, the tracks 4 can be written in a spiraling pattern instead of as a series of concentric circles.

Error Correction

Referring still to FIG. 2A, a disturbance has occurred (e.g., a shock, vibration, etc.), causing the recording head 50 to move, as represented by the arrow. As shown, the overlapping shingles are being written in a first radial direction, and the radial component of the recording head movement due to the disturbance is in the direction of shingling. For example, the head 50 moves in a trajectory having a significant non-zero component in the radial direction of the shingling. This direction can be towards the ID or OD of the disk 60, depending on the particular shingling direction, for example. The recording head 50 deviation corrupts the currently written data sector DU, as indicated by the hashing.

Generally, writing data to an adjacent track in the vicinity of previously written data can corrupt the previously written data. For example, writing causes magnetic flux interference on the adjacent tracks to accumulate, leaving the adjacent tracks unreadable. This phenomenon is referred to generally as adjacent track interference (ATI). As discussed above, in certain architectures (e.g., non-shingled architectures), tracks are spaced with sufficient margin so as to reduce or eliminate the effects of ATI. However, for shingled architectures in which there is generally no spacing between tracks, ATI can result in data corruption if unaccounted for. In such circumstances, to compensate for ATI, system designers specify a maximum allowable number of times an adjacent track can be written.

Figure 2B:
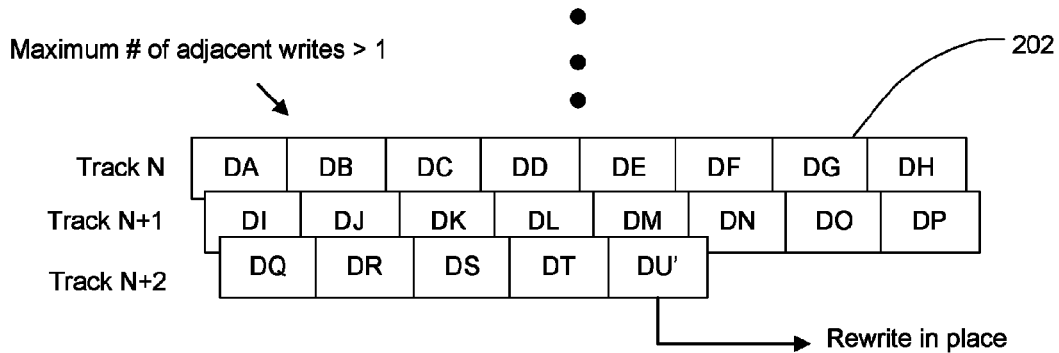
FIGS. 2B-2C schematically illustrate example schemes for correcting the data corruption of FIG. 2A, where the maximum number of allowable adjacent track writes is greater than one, and equal to one, respectively.

FIG. 2B schematically illustrates an example scheme for correcting the corruption of the data segments in disk drive shown in FIG. 2A where the maximum specified number of adjacent track writes is greater than one. For example, in various embodiments, the maximum number of allowable adjacent track writes may be 2, 3, 4, 5, 10, 50, 100, 200, 500, 1000, or more. The error correction module 12 may receive an indication that the head 50 has deviated from its predetermined trajectory due to a shock, vibration, or other events.

For example, the error correction module 12 receives and/or processes a signal from one of the external sensors described above indicating that the head has deviated by a threshold amount. Alternatively, the error correction module 12 may receive and/or process the PES signal to determine that the head has veered from its predetermined trajectory. In response to the signal, the error correction module 12 further determines a direction in which the head has deviated from the predetermined trajectory. As one example, the error correction module 12 may evaluate the sign of the PES signal to determine the direction of head deviation.

Still referring to FIG. 2B, the error correction module 12 determines that the direction of head deviation is in the radial direction of the shingling, away from previously written tracks. Thus, the error correction module 12 deduces that data in the previously written tracks has not been corrupted by the recording head 50 deviation. As such, the error correction module 12 rewrites a new copy DU' of data in only the corrupted current data sector. Moreover, because the maximum number of allowable adjacent track writes is greater than one in the example of FIG. 2B, data DU' can be written in the current sector of the current track without reaching the maximum specified number of allowable adjacent track writes and without corrupting data the adjacent $Track_{N+1}$.

A variety of alternative algorithms are possible. As just one example, in another embodiment, the entire $Track_{N+2}$ is rewritten instead of only the current data sector DU.

Figure 2C:
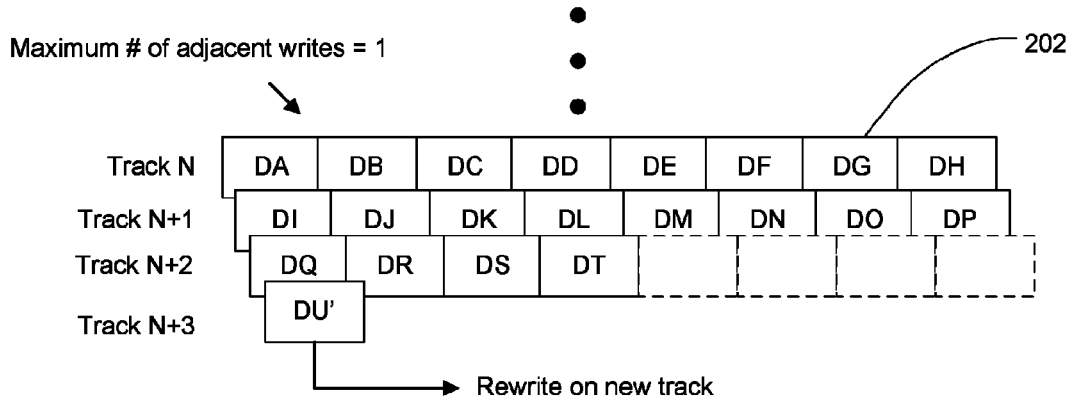

FIG. 2C schematically illustrates an example scheme for correcting the corruption of the disk drive shown in FIG. 2A, where the maximum specified number of adjacent track writes is one. In this case, because the corrupted data sector DU has already been written to once, the error correction module 12 cannot write the new copy DU' of data in $Track_{N+2}$ due to the ATI policy. Thus, the new copy DU' is written at the beginning of the next $Track_{N+3}$. In other embodiments, one or more tracks may be skipped over instead of moving to the directly adjacent track. The controller 10 may also map out the remaining unused slots in $Track_{N+2}$.

Again, alternative schemes are possible. For example, in one configuration, a new copy of the entire $Track_{N+2}$ where the corruption occurred is rewritten to the next $Track_{N+3}$ instead of just the single corrupted data sector DU'. Moreover, according to an alternative ATI policy, in one embodiment, rather than skipping directly to the new $Track_{N+3}$, the error correction module 12 simply skips the sector in $Track_{N+2}$ corresponding to the corrupted value DU, and writes the new copy DU' and subsequent data to the remaining sectors in $Track_{N+2}$.

Figure 3A:
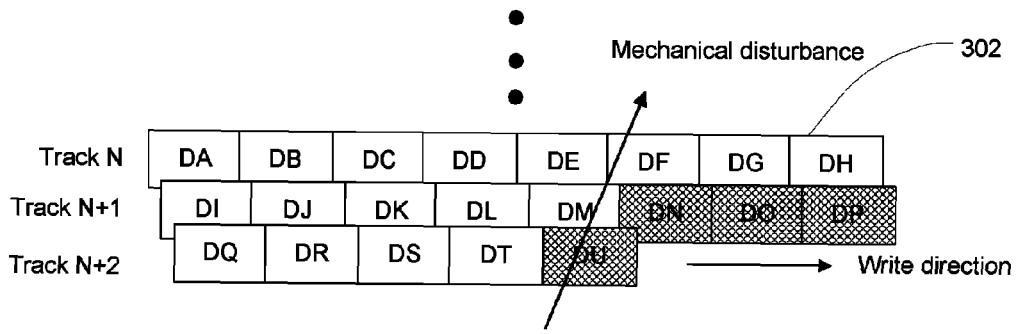
FIG. 3A schematically illustrates a portion of a shingled disk drive where a disturbance in the direction of previously written data causes corruption of data in a current track and in a previously written track according to an embodiment.

FIG. 3A schematically illustrates portion of an example shingled disk drive where a disturbance in the direction of previously written data causes data corruption of both current and previously written data. Here, both the current data sector DU in the current $Track_{N+2}$ and previously written data sectors DN, DO and DP in the previously written $Track_{N+1}$ are corrupted.

Figure 3B:
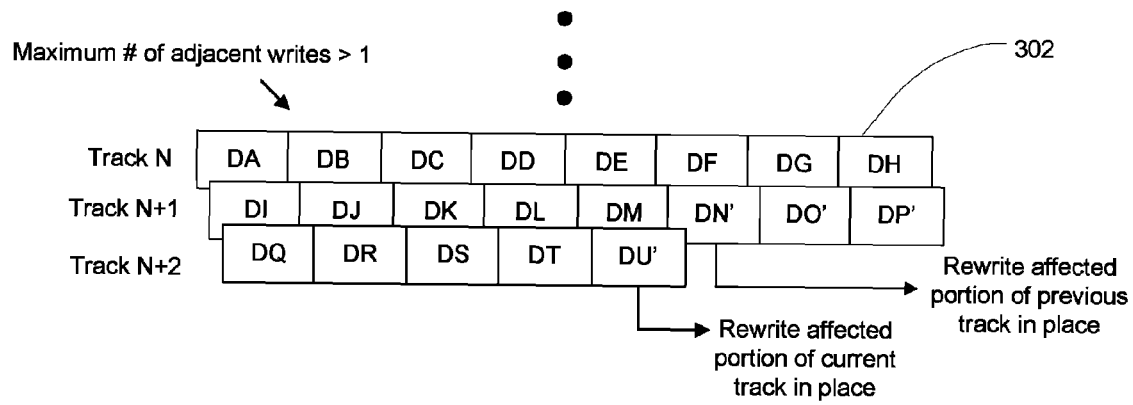
FIGS. 3B-3C schematically illustrate example schemes for correcting the data corruption of FIG. 3A, where the maximum number of allowable adjacent track writes is greater than one, and equal to one, respectively.

FIG. 3B shows an example scheme for correcting the data corruption illustrated in FIG. 3A, where the maximum specified number of adjacent track writes is greater than one. Here, the error correction module 12 rewrites the corrupted data sectors in their original tracks because the maximum number of adjacent track writes is greater than one. As such, according to the example, new data copies DN', DO', DP' of the corrupted data sectors DN, DO, DP are written in $Track_{N+1}$. Also, a new data copy DU' is written in place to the corrupted data sector DU.

Again, a wide variety of algorithms can be used for rewriting the data. In an alternative implementation, the entire previously written data $Track_{N+1}$ is rewritten instead of just the three corrupted data sectors DN, DO, DP. Moreover, each of the previously written, the entire $Track_{N+2}$ can also be rewritten instead of just the corrupted data sector DU.

Figure 3C:
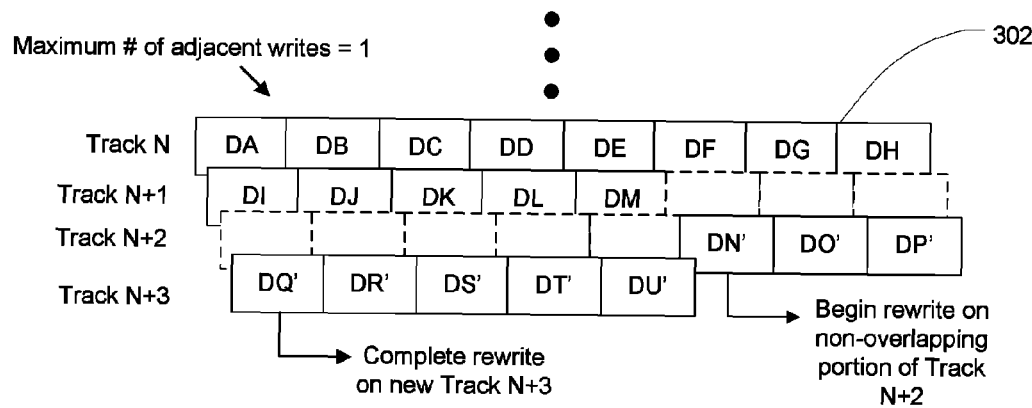

FIG. 3C shows an example scheme for correcting the data corruption illustrated in FIG. 3A, but where the maximum number of adjacent track writes is equal to one instead of greater than one. Here, at least the portions of the current $Track_{N+2}$ that are adjacent to valid data in adjacent $Track_{N+1}$ cannot be rewritten because the maximum number of adjacent track writes is equal to one. Thus, the sectors of $Track_{N+2}$ corresponding to originally written data DQ, DR, DS, DT and DU are rewritten because they are adjacent to valid data sectors storing the data DI, DJ, DK, DL and DM, respectively, in the adjacent $Track_{N+1}$.

Moreover, the previously written corrupted sectors of $Track_{N+1}$ storing corrupted data DN, DO, DP cannot be rewritten so as to conform to the ATI policy with respect to adjacent $Track_{N}$. Thus, the error correction module 12 rewrites new copies DN', DO', DP' to the three remaining sectors of $Track_{N+2}$, as shown. In this case, the error corruption module 12 maps out the valid data sectors corresponding to original data DQ, DR, DS, DT in $Track_{N+2}$ even though these data sectors have not been corrupted, and rewrites new copies DQ', DR', DS', DT' to new $Track_{N+3}$. Rewriting this uncorrupted data to sectors in $Track_{N+3}$ preserves the logical ordering of the data. Finally, a new copy DU' of the corrupted data DU' is also written to the new $Track_{N+3}$.

The controller 10 may store data from one or more previously written tracks in a buffer. For example, the controller 10 may store data for a certain number (e.g., 1, 2, 3, 4, 5, 10, 50, 100 or more) of the most recently written tracks or sectors thereof in the buffer. Thus, the error correction module 12 can retrieve the buffered data for rewriting. In the example of FIG. 3, for example, data DN, DO and DP are retrieved from the buffer. Moreover, data from the current track (e.g., DU) can also be stored in and retrieved from the buffer, or may be kept in a different storage structure, depending on the implementation.

Again, other rewrite algorithms can be used. For example, the uncorrupted data DQ, DR, DS, DT in the track $Track_{N+2}$ according to one embodiment is left in place rather than being mapped out and rewritten. According to this alternative scheme, the data is no longer stored sequentially in physically contiguous memory space. The controller 10 may therefore maintain additional bookkeeping information to keep track of the physical location of the data.

The above-described technique may involve assessing the integrity of at least some of the data sectors in the current track and/or one or more previously written. For example, referring to FIG. 3A, the error correction module 12 may determine which specific data sectors (or data words, or other granularity of data) in the previously written $Track_{N+2}$ has been corrupted. The process 500 can further include rewriting at least some of the data from the one or more previously written tracks based on the integrity determination. For example, referring to FIGS. 3A-3C, the controller 10 reads the data in $Track_{N+2}$ and determines that only the data sectors DN, DO, DP have been corrupted, and only rewrites these data sectors.

The integrity determination can be implemented in a variety of ways. As one illustrative example, the error correction module 12 compares the integrity of the data in one or data sectors of $Track_{N+1}$ in proximity (e.g., adjacent) to the sector of $Track_{N+2}$ where the shock event occurred to the integrity of data in one of more sectors of $Track_{N+1}$ not in physical proximity to the sector where the shock event occurred. In the example, the integrity check is done by comparing the off-track read capability (OTRC), PBERT, or other appropriate metric, of the respective memory locations.

Also, in some cases the error correction module 12 also assesses the integrity of data in the current track. Moreover, in some embodiments, the integrity determination is advantageously only performed when the head 50 deviation is in the direction of one or more previously written tracks, simplifying the error correction operation.

As touched on above respect to the example of FIGS. 2-3, the entire track or entire sub portions thereof can be rewritten instead of only corrupted sectors or other portions. For instance, one or more entire affected tracks can be rewritten. Generally, this is true for the current track and/or any affected previously written tracks, depending on the direction of head deviation. Moreover, according to certain embodiments, rewriting the entire track, sector, or other sub-portion thereof can be done in lieu of assessing the integrity of the specific data sectors, thereby reducing overhead associated with the error correction process.

Moreover, in some embodiments, more than one previously written track may be rewritten. For example, the error correction module may assess the integrity of and/or rewrite one or more sectors for a predetermined number of previously written tracks (e.g., 2, 3, 4, 5, 10, 50, 100 or more). In another configuration, the error correction module 12 dynamically determines how many previously written tracks to evaluate and/or rewrite. For example, the error correction module 12 may use the PES or other input to determine the magnitude of head deviation in the direction of previously written tracks, and use this value to determine the number of tracks that may have been affected.

As described, according to certain advantageous embodiments, the direction of head deviation is used to dynamically determine the appropriate corrective action to employ. However, according to certain other compatible techniques, the direction of head deviation is not involved in the error correction process. For example, in one scenario, a certain number of adjacent tracks (or portions thereof) on either side of the affected track are rewritten, regardless of the direction of head deviation. Moreover, while the above example is described with respect to a shingled architecture, error correction techniques described herein are compatible with a wide variety of data writing policies, such as those including the LBA/PBA mapping policy described above, those incorporating spaced tracks, spiraled tracks, or a combination thereof.

Relaxing the Write-Unsafe Limit

As touched on briefly above, according to the techniques described herein, the write-unsafe (WUS) limit can be increased, improving drive performance. For example, the WUS limit can be relaxed for head displacements in the direction of shingling, resulting in an asymmetric WUS limit.

For instance, if the error correction module 12 determines that the head 50 has deviated in the direction of previously written data (e.g., radially towards previously written shingles), it is relatively likely that previously written data will have been affected. Thus, a first, relatively tight WUS limit may be specified for head deviation in the direction of previously written data to preserve data integrity. On the other hand, when the error correction module 12 determines that the head 50 has deviated away from previously written data (e.g., radially in the direction of yet to be written shingles), previously written data is unlikely to have been affected. As such, a second, relatively looser WUS limit can be specified for head deviation in the direction of shingling, improving drive performance.

Example Process

Figure 4:
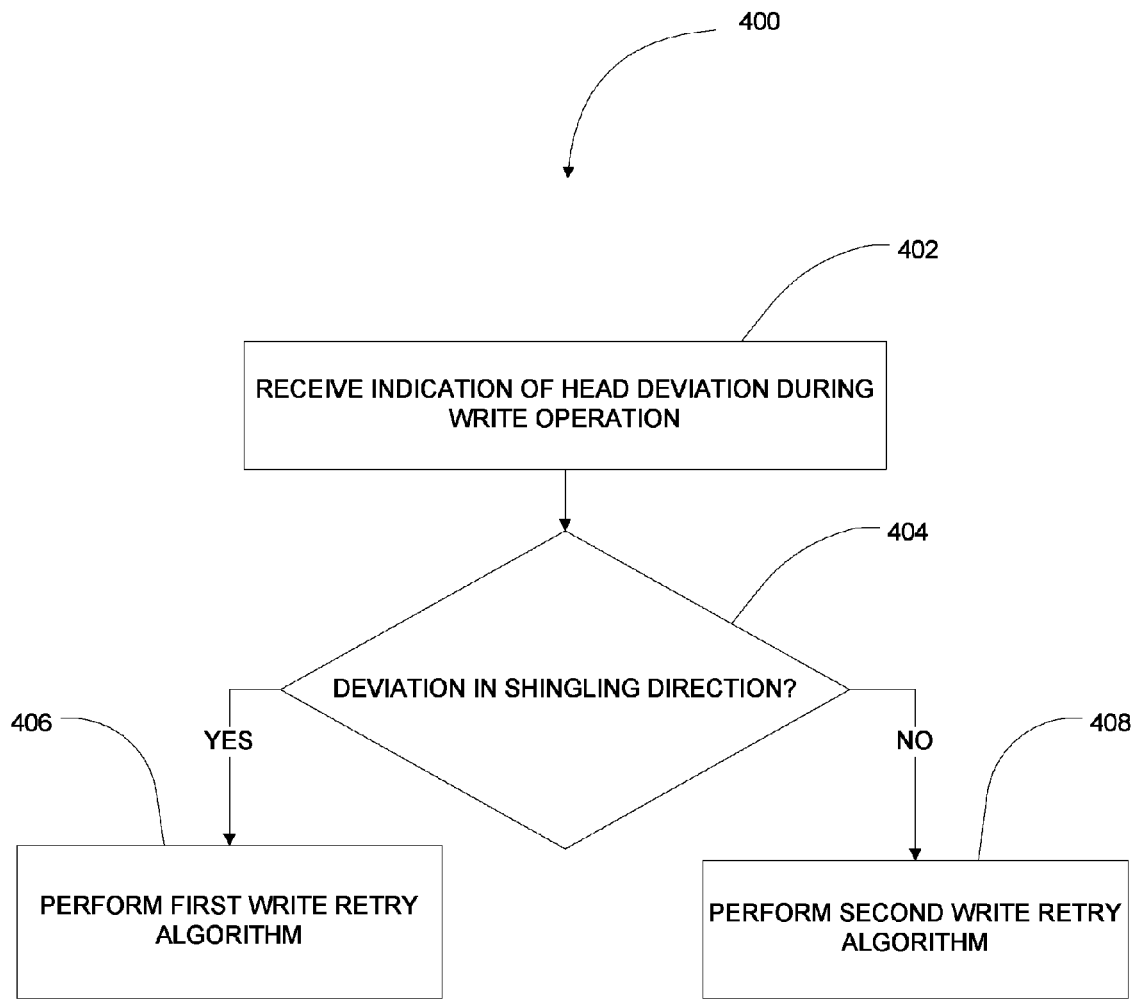
FIG. 4 illustrates an example process for performing error correction according to certain embodiments.

FIG. 4 illustrates an example process 400 for performing error correction according to certain embodiments. This and generally any of the error correction processes described herein may be implemented in firmware code executed by the controller 10; in application-specific circuitry of the controller 10; analog circuitry; or a combination thereof. If implemented partly or wholly in firmware or other executable code, the executable code may be stored in any appropriate type of non-transitory computer readable medium, such as a solid state memory device. For example, each of the processes may be implemented by the error correction module 12 alone or in conjunction with one or more other components of the drive 2.

Referring first to the process 400 of FIG. 4, at block 402, the process 400 receives an indication of head deviation that occurs during a write operation. For example, process may receive the indication by analyzing the PES signal, from one or more of the sensors described herein, or in another appropriate manner. At block 404, the process 400 determines the direction of head deviation. For example, the process 400 determines whether the head has deviated in the direction of shingling, as described above with respect to FIGS. 2-3. Again, the PES signal or another sensor indicating directional information can be used to make the directional determination.

If the head has deviated in a first direction, process 400 performs a first write retry algorithm. For instance, as shown in the example of FIGS. 2A-2C, if the process 400 determines that the head has deviated in the radial direction of shingling, the process 400 the process 400 performs a first write retry algorithm at block 406. Referring to the example of FIGS. 2A-2C, if the process 400 determines that the head has not deviated in the radial direction of shingling, the process 400 advantageously selects a first, simplified rewrite algorithm in which only the current track or a portion thereof is rewritten.

On the other hand, if the process 400 determines that the head has deviated in a second direction, the process performs a second write retry algorithm at block 408. Referring to the example shown in FIGS. 3A-3C, if the process 400 determines that the head has deviated in the radial direction of previously written tracks, the process 400 rewrites at least some of the data in the previous written tracks in addition to at least some of the data in the current track. Thus, according to such a technique, the process 400 tailors the error correction effort based on the direction of head deviation, thereby improving performance.

Additionally, the features and attributes of the specific embodiments disclosed above may be combined in different ways to form additional embodiments, all of which fall within the scope of the present disclosure. Although certain embodiments have been disclosed, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. A method of performing error correction in a shingled disk drive, comprising:
   writing data to a disk in a first radial direction using a head, the head moving according to a predetermined trajectory; and
   by a controller of the disk drive:
      receiving a signal indicating that the head has deviated from its predetermined trajectory while writing a current data sector to a first track of the disk;
      in response to the signal, determining a direction in which the head deviated from the predetermined trajectory; and
      when it is determined that the head deviated in the first radial direction, rewriting the current data sector to a second track located adjacent to the first track in the first radial direction; and when it is determined that the head deviated in a second radial direction substantially opposite to the first radial direction:
    rewriting one or more corrupted data sectors from a third track to the first track, the third track located adjacent to the first track in the second radial direction; and
    rewriting one or more data sectors from the first track to the second track.

2. The method of claim 1, wherein the writing comprises writing the data as a plurality of concentric tracks and wherein the tracks are written sequentially in the first radial direction.

3. The method of claim 2, further comprising assessing the integrity of at least some of the data in one or more previously written tracks in order to identify the one or more corrupted data sectors from the third track.

4. The method of claim 2, wherein when it is determined that the head deviated in the first radial direction, the current data sector is rewritten to the second track without assessing the integrity of data in any previously written tracks.

5. The method of claim 1, wherein when it is determined that the head deviated in the first radial direction, the current data sector is rewritten to the second track without rewriting data from any previously written tracks.

6. The method of claim 1, further comprising determining a maximum number of allowable adjacent track writes.

7. The method of claim 1, further comprising:
    storing data written to the one or more corrupted data sectors in a buffer; and
    retrieving the data from the buffer for the rewriting of the one or more corrupted data sectors.

8. The method of claim 1, further comprising determining a magnitude of head deviation, wherein determining that the head deviated in the first radial direction comprises determining that the magnitude of head deviation exceeds a first threshold value and determining that the head deviated in the second radial direction comprises determining that the magnitude of head deviation exceeds a second threshold value.

9. The method of claim 8, wherein the first and second threshold values are write unsafe (WUS) limits and the first threshold value is greater than the second threshold value.

10. A shingled disk drive, comprising:
    a rotatable disk;
    a head configured to write data to the disk in a first radial direction and to move according to a predetermined trajectory; and
    a controller configured to:
        (a) receive a signal indicating that the head has deviated from its predetermined trajectory while writing a current data sector to a first track of the disk;
        (b) determine, in response to the signal, a direction in which the head deviated from the predetermined trajectory;
        (c) when it is determined that the head deviated in the first radial direction, rewriting the current data sector to a second track located adjacent to the first track in the first radial direction; and
        (d) when it is determined that the head deviated in a second radial direction substantially opposite to the first radial direction:
            rewriting one or more corrupted data sectors from a third track to the first track, the third track located adjacent to the first track in the second radial direction; and
            rewriting one or more data sectors from the first track to the second track.

11. The shingled disk drive of claim 10, wherein the head is configured to write data to the disk as a plurality of concentric tracks, wherein the tracks are written sequentially in the first radial direction.

12. The shingled disk drive of claim 11, wherein the controller is further configured to access the integrity of at least some of the data in one or more previously written tracks in order to identify the one or more corrupted data sectors from the third track.

13. The shingled disk drive of claim 12, wherein the controller is further configured to, when it is determined that the head deviated in the first radial direction, rewrite the current data sector to the sector without assessing the integrity of data in any previously written tracks.

14. The shingled disk drive of claim 10, wherein the controller is further configured to, when it is determined that the head deviated in the first radial direction, rewrite the current data sector to the second track without rewriting data from any previously written tracks.

15. The shingled disk drive of claim 10, wherein the controller is further configured to determine a maximum number of allowable adjacent track writes.

16. The shingled disk drive of claim 10, further comprising:
    a buffer configured to store data written to the one or more corrupted data sectors;
    wherein the controller is further configured to retrieve the data from the buffer for rewriting of the one or more corrupted data sectors.

17. The shingled disk drive of claim 10, wherein the signal comprises a position error signal (PES).

18. The shingled disk drive of claim 10, further comprising a sensor configured to generate the signal.

* * * * *